United States Patent [19]

Hooykaas et al.

[11] Patent Number: 5,430,235
[45] Date of Patent: Jul. 4, 1995

[54] FIXANT FOR MIXED ORGANIC AND INORGANIC CONTAMINATED MATERIALS AND METHOD FOR USING SAME

[75] Inventors: Carel W. J. Hooykaas, Rotterdam, Netherlands; Jeffrey P. Newton, Wichita, Kans.

[73] Assignee: Pelt & Hooykaas B.V., Netherlands

[21] Appl. No.: 955,297

[22] Filed: Oct. 1, 1992

[30] Foreign Application Priority Data

Oct. 1, 1991 [NL] Netherlands ............ 9101655

[51] Int. Cl.⁶ ............ A62D 3/00; B09B 3/00
[52] U.S. Cl. ............ 588/252; 405/128; 405/263; 588/249
[58] Field of Search .......... 588/252, 256, 257; 405/128, 129, 258, 266, 263, 264; 210/251

[56] References Cited

U.S. PATENT DOCUMENTS

| | | |
|---|---|---|
| 3,487,928 | 1/1970 | Canevari . |
| 3,837,872 | 9/1974 | Conner ............ 588/252 |
| 4,118,243 | 10/1978 | Sandesara ............ 588/256 |
| 4,132,558 | 1/1979 | Uchikawa et al. ............ 588/256 X |
| 4,142,912 | 3/1979 | Young ............ 588/252 |
| 4,149,968 | 4/1979 | Kupiec et al. ............ 588/252 X |
| 4,209,335 | 6/1980 | Katayama et al. ............ 588/252 |
| 4,353,749 | 10/1982 | Ray et al. ............ 588/256 |
| 4,518,508 | 5/1985 | Conner ............ 588/257 |
| 4,650,590 | 3/1987 | Beall . |
| 4,659,385 | 4/1987 | Castopoulos et al. ............ 588/256 X |
| 4,668,124 | 5/1987 | Pitts et al. ............ 588/252 X |
| 4,781,860 | 11/1988 | Doan ............ 405/129 X |
| 4,822,496 | 4/1989 | Griffiths et al. . |
| 4,948,516 | 8/1990 | Fisher et al. ............ 210/751 |
| 5,276,255 | 1/1994 | Stark ............ 588/257 |
| 5,304,706 | 4/1994 | Hooykaas ............ 588/257 X |
| 5,304,710 | 4/1994 | Kigel et al. ............ 588/257 |

FOREIGN PATENT DOCUMENTS

0283600 9/1988 European Pat. Off. .
0482718 4/1992 European Pat. Off. .

OTHER PUBLICATIONS

Checmical Abstracts vol. 102, No. 10 Mar. 11, 1985, abstr. nr. 83429v.

*Primary Examiner*—Dennis L. Taylor
*Attorney, Agent, or Firm*—Levine & Mandelbaum

[57] ABSTRACT

A toxic waste fixant for detoxification of a contaminated material includes a mixture of ferric sulfate, manganese sulfate, organophilic clays, an oxidizer and aluminium sulfate. The respective amounts are preferably about 15–19% b.w. of ferric sulfate, about 15–19% b.w. of manganese sulfate, about 37–46% b.w. of organophilic clay, about 16–19% b.w. of an oxidizer and about 0–12,5% b.w. of alumimium sulfate. All or part of the ingredients in said fixant may be added as a pretreatment into contaminated materials such as soils, sediments, or sludges. This pretreatment can range from 0 to 100% b.w. to said material. The fixant is blended with various amounts of Portland cement, and/or blast furnace slag, or lime, or gypsum, or coal fly ash, or cement kiln dust as a means to derive a chemical fixation treatment for contaminated soils, sediments, and sludges to prevent the leaching of organic and inorganic compounds and elements.

19 Claims, No Drawings

FIXANT FOR MIXED ORGANIC AND INORGANIC CONTAMINATED MATERIALS AND METHOD FOR USING SAME

BACKGROUND OF THE INVENTION

This invention relates to the field of toxic waste treatment, and, more particularly to a toxic waste fixant for preventing the leaching of organic and inorganic toxics at unacceptable levels from materials such as soils, sediments, and sludges and cause a significant reduction in the inherent toxicity concentration of a contaminated material by chemical mechanisms as well as a method for using that fixant.

The problem of the safe disposal of toxic waste materials is a pressing one. With the ever increasing generation of hazardous materials in our industrial society, there is a growing demand for strict controls of the handling and disposal of all forms of toxic waste. In response to that demand, legislatures, both state and federal, have passed laws limiting the amount and nature of wastes which may be discharged into the environment. There has been a great deal of movement of late to make these laws more stringent, and reaching the goals set forth in the laws may soon become much more difficult.

Toxic wastes are legally defined in the various statutes and regulations dealing with their handling and treatment, but they may be broadly defined as any material generated as a by-product of an industrial process capable of having an adverse impact upon the environment if discharged without treatment.

The statutes and regulations also set forth the standards to be met by the industry which generates the waste, generally by setting maximum limits of a specified number of parts-per-million (ppm), parts per billion (ppb), or parts per trillion (ppt) of the free waste found in the test samples, as measured relative to a leaching test standard. It is thus the goal of toxic waste treatment processes to reduce the levels of the waste present and or leaching in an excessive degree in the test samples to the lowest levels possible, at least to a level below the mandated maximum.

Known methods of treating toxic wastes, in terms of stabilization/solidification or chemical fixation methods, include, for example the five broad categories of: sorption, lime-fly-ash pozzolan process, pozzolan-Portland cement systems, thermoplastic microencapsulation, and macroencapsulation.

Sorption involves adding a solid to material containing the waste to be treated. The solid soaks up any liquid present, and may produce a soil-like material containing the waste, and is most suitable for applications involving the treatment of non-reactive, non-biodegradable wastes. Typical solids suitable for use in sorption include activated carbon, anhydrous sodium silicate, various forms of gypsum, celite, clays, expanded mica, zeolites, coal fly ash, cement kiln dust, and lime.

Lime-fly-ash pozzolanic processes utilize a finely divided, non-crystalline silica in fly ash, and the calcium in the lime to produce a low-strength cementation. The treated wastes are entrapped within the pozzolan concrete matrix (micro-encapsulation), thereby removing them from contact with the environment.

Pozzolan-Portland systems use Portland cement and fly ash, or other pozzolan materials to produce a stronger type of waste/concrete composite. Waste containment results from microencapsulation of the waste in the concrete matrix. Soluble silicates may be added to accelerate hardening and metal containment.

Thermoplastic microencapsulation involves blending fine particulate waste with melted asphalt or other matrix. Liquid and volatile phases associated with the wastes are isolated in a mass of cooled, hardened, asphalt. The resultant material can be buried without a container.

Microencapsulation systems contain waste by isolating large masses of the waste using some form of jacketing material. The most carefully researched systems use a 208-drum or polyethylene jacket fused over a monolithic block of solidified wastes.

These systems are useful, and appropriate for many applications, but they are not suitable for meeting all current state and federal laws and for all types of materials. There still exists a need for a solidification/stabilization/fixation system for treating toxic wastes to prevent the leaching of impermissible levels of these organic and inorganic wastes into the environment, particularly soils, sediments, and sludges that contain relatively high levels of organics as well as inorganic toxic constituents. There thus exists a need for a new material which can be used in certain applications for the disposal or containment of some of these forms of toxic wastes to a greater degree than heretofore known.

OBJECTS AND SUMMARY OF THE INVENTION

Accordingly, it is an object of the invention to provide a toxic waste fixant which overcomes the drawbacks of the prior art. It is a further object of the invention to provide a toxic waste fixant which renders mixed organic and inorganic toxic wastes non-leachable to a greater degree than known methods.

It is a still further object of the invention to provide a toxic waste fixant with an improved microstructure in the presence of high concentrations of acid, leaching solvents, salt water or other conditions which may impair the leaching resistance of the fixant.

Briefly stated, there is provided a toxic waste fixant for detoxification of a contaminated soil, sediment, and or sluge material. The fixant comprises at least a clay mineral, an iron salt, a manganese salt and an oxidizer. It will be obvious that by an iron salt, an iron (II) as well as an iron (III) salt is meant.

Preferably, the oxidizer present in the fixant according to the invention is chosen from the group comprising sodium persulfate, potassium persulfate and potassium permanganate.

According to a special embodiment, the present fixant further comprises an aluminium salt.

The metal salts of the fixant are expediently metal sulfates or metal chlorides, the sulfates being preferred. The invention is nevertheless not restricted to these anions; other anions having an equivalent effect can also be used.

Further, it is remarked that the iron salt(s) present can be replaced partially or completely by a cobalt salt. Cobalt ions are more reactive than iron ions; cobalt is nevertheless more expensive.

According to another embodiment, the present fixant also includes a clay mineral, especially of the smectite group, preferably sodium bentonite or hectorite. Of course, the clay minerals to be used are not restricted to those of the smectite group. Other clay minerals used for fixing waste can also be used. Preference is in this regard given to an organophilic clay. A modified clay mineral, obtained by pre-treatment of said clay with an ammonium compound, preferably chosen from the group comprising amines, purines and pyridines, gives excellent results. Nevertheless a clay which has been treated with a polyhedric alcohol can be used as well.

With regard to the respective amounts of the components of a fixant according to the invention the following is remarked.

The amount of the iron and/or cobalt salt may range up to 25% b.w. of the fixant, and is preferably from about 15 to 19% b.w. The amount of the manganese salt, especially manganese sulfate, may also be up to 25% b.w., and ranges preferably from 15 to 19% b.w.

Preferably the fixant comprises from 30 to 60% b.w. of the clay mineral, especially from 35 to 50% b.w. As has been mentioned said clay mineral may be a modified clay mineral, the modification depending more or less from the toxic waste material to be treated.

According to a feature of the invention the present fixant also comprises an oxidizer. The content of said oxidizer is up to 25% b.w., especially from 15 to 19% b.w.

According to a further feature of the invention, the fixant comprises up to about 15% b.w. of an aluminium salt, especially about 12%, the salt preferably being the sulfate.

In order to obtain a hard, rock-like material, the present fixant is combined with an inorganic, hydraulic binder, chosen from the group comprising a cement, ground and/or granulated blast furnace slags; fine and/or ground steelslags; porous granulated steelslags; lime, or a mixture thereof. If necessary, gypsum can be added to control the setting time and the hardness of the endproduct.

When the toxic waste to be treated comprises a considerable amount of heavy metals it appears suitable to use of fixant which comprises trimercapto-S-triazine trisodium salt. The content of said trisodium salt will of course depend upon the concentration of the heavy metals in the waste to be treated, and can easily be determined by any expert in a preliminary test.

Besides the above-given combinations, the present fixant can also be added to various mixtures of Portland cement, blast furnace slag, gypsum, lime (calcium oxide), coal fly ash, soil and cement kiln dust. As a further point regarding the use of the fixant it may be added in whole or in part to soil as a pretreatment agent which subsequently becomes part of the overall treated matrix. Pretreatment is defined as initial step or steps in the stabilization/fixation process in which a soil, sediment, or sludge is mixed with a matrix building material such as soil, sand, cement, fly ash, cement, etc. that allows the final treatment with the fixant and cement, slag, etc. mixture to achieve better end state physical and leaching properties.

According to an embodiment of the invention, there is provided a fixant for chemically and physically bonding organic and inorganic toxic wastes, said fixant comprising a mixture of: ferric sulfate, manganese sulfate, organophilic smectite clays, an oxidizer, such as potassium or sodium persulfate, combined with a mixture of cement, slag and gypsum.

According to a feature of the invention, there is provided a fixant for treating toxic wastes comprising: a cement, of fifty percent of the weight of said fixant, blast furnace slag, of thirty-one percent of the weight of said fixant, gypsum, of six percent of the weight of said fixant, organophilic smectite clays, of six percent of the weight of said fixant, ferric sulfate, of 2.5 percent of the weight of said fixant, manganese sulfate, of 2.5 percent of the weight of said fixant, and potassium or sodium persulfate, of two percent of the weight of said fixant.

The invention further relates to a process for treating toxic waste wherein said waste is mixed with a fixant according to the invention, water is added if desired, and said mixture is in the presence of an inorganic hydraulic binder left to solidify to obtain a hard, rock-like product.

According to a further feature of the invention, there is provided a method of treating a soil, sediment, and or sludge material containing a toxic waste, comprising the steps of; mixing a fixant, said fixant including a cement, slag, gypsum, organophilic clays, ferric sulfate, manganese sulfate, and potassium or sodium persulfate, adding said fixant to said contaminated material, whereby said fixant cures in said material, and renders said toxic waste substantially less leachable relative to the toxic constituents after treatment. A secondary but important objective is to reduce the presence of the toxic constituents of the contaminated soil, sediment, or sludge by some form of chemical reaction.

The above, and other objects, features and advantages of the present invention will become apparent from the following description.

DETAILED DESCRIPTION OF THE PREFERRED EMBODIMENT

The invention is directed to the manufacture and use of a fixant for treating toxic wastes found in a contaminated soil, sludge or sediment material. In the following description of the preferred embodiment of the invention, the material is a soil containing the toxic waste, but this is not intended to be limitative, merely illustrative.

The efficacy of the treatment of soils containing organic and inorganic toxic wastes is measured by the fractional portion of the soil consisting of the toxic waste, in ppm (parts per million), ppb (parts per billion), or ppt (parts per trillion), as appropriate versus the amount of such toxic wastes capable of leaching from the contaminated soil under both leach and solvent extraction tests as measured by the GC/MS.

It has been determined that the fixant, defined as a mixture of ferric sulfate, manganese sulfate, organophilic clays, and an oxidizer, such as potassium or sodium persulfate, combined with a mixture of cement, blast furnace slag, and gypsum, presents much improved efficacy in the treatment of toxic inorganic and organic contaminated soils, sediments, and sludges. The contaminated materials may contain such toxics as lead, mercury, arsenic, chromium, cadmium, PCBs, polynuclear aromatics, benzene, toluene, xylenes, volatile organics, halogenated organics, etc.

The mechanism of the reaction, although not fully understood is disclosed herein to provide as much insight as possible into the mechanisms of the treatment activity afforded by the fixant. The composition and activity of the invention are described in detail.

The fixant effects chemical change in the structure of toxic by for example ionic exchange, substitution reactions, intermolecular forces (dipole-dipole), hydrogen bonds, London forces, bimolecular displacement, and various organo-metallic bonding of the toxic components in the contaminated material. These changes convert the toxic waste into innocuous compounds and complexes thereby lowering the overall levels of free toxic components remaining in the material after treatment. The fixant binds the toxic constituents into a hardening concrete matrix.

Specifically the fixant is added to a second mixture to form a new mixture, this combined mixture for treating toxic wastes comprises: a cement, of 50% b.w. of said fixant, blast furnace slag, of 31% b.w. of said fixant, gypsum, of 6% b.w. of said fixant, organophilic smectite clays, of 6% b.w. of said fixant, ferric sulfate, of 2.5% b.w. of said fixant, manganese sulfate, of 2.5% b.w. of said fixant, and potassium or sodium persulfate, of 2% b.w. of said fixant.

The fixant is then blended into a combined mixture of; Portland cement, is 50% b.w. of the combined mixture; blast furnace slag, is 31% b.w. of the combined mixture; and of gypsum, is 6% b.w. of the combined mixture. The fixant is 13% b.w. of the combined mixture. Portland cement, slag and gypsum are commonly available articles of commerce. Their combination, by themselves and in various combinations, have been performed many times in the art, for treating toxic wastes, such as in the described sorption and pozzolan-Portland cement systems.

The fixant can also be blended into a mixture which the Portland cement portion of the previously given combined mixture can be substituted by an expanded slag portion in which the blast furnace slag can range from 40 to 70% b.w. of the combined mixture. In this particular mixture, Portland cement would range from 0 to 41% of the combined mixture. Lime, calcium oxide, can be added from 0 to 40% b.w. of the combined mixture and gypsum, which can be added to the combined mixture from 0 to 12% b.w. of the combined mixture.

In addition the previously given formulation, the fixant can be altered to improve the leach testing results in certain cases by adding aluminium sulfate, from 12 to 19% b.w. of the fixant. Therefore the formulation of the fixant can be a mixture ferric sulfate, manganese sulfate, organophilic clays, an oxidizer such as potassium or sodium persulfate or potassium permanganate, and aluminium sulfate, therefore a version of the formulation of the fixant becomes:

| Component | Percent by weight of fixant |
| --- | --- |
| Ferric sulfate | 15.6 |
| Manganese sulfate | 15.6 |
| Organophilic clays | 37.55 |
| Potassium or sodium persulfate | 18.75 |
| Aluminium sulfate | 12.5 |

It has also been discovered that improved results in the use of the fixant in the treatment of organic content toxic waste may be realized by the addition of an intercalation compound such as organophilic smectite clays to the fixant. The intercalation compound comprises a chemically processed or treated clay mineral of the smectite group. These clay minerals, such as sodium bentonite or hectorite, are processed with ammonium compounds such as amines, purines of pyridines, for imparting organophilic property thereto. Smectites may also be processed with glycols, glycerols or other polyhedric alcohols to render them suitable for use in the fixant. Suitable intercalation compounds or organophilic clays are commercially available.

The microstructure of materials treated with the fixant exhibit increased durability, compared to known systems, in the presence of high acidity (to pH 3), in various leaching solvents, salt water, or other conditions in which it would be impaired.

Furthermore, the fixant is relatively inexpensive, so it may compare favorably to other, less desirable, alternatives, such as incineration or confinement to toxic waste dumps.

Treating a soil, sediment, or sludge material containing organic and inorganic toxic wastes with the fixant produces a substance having a complex crystalline, i.e. four or more connective network, inorganic polymer. The resultant macromolecules comprise selected polyvalent inorganic elements that react in a polyfunctional manner, and produce branched and cross-linked polymers having a density sufficient to cause some IPN (Interpenetrating Polymer Network) bonding. The resultant polymers also have a high resistance to acids or other naturally occurring deteriorates. Structural bonding in the polymer is primarily ionic and covalent. There is a two-phase reaction in which the toxic components are complexed first in a rapid reaction, and then permanently complexed further in the building of macromolecules which continue to generate over a long period of time.

The first phase of the fixation generates irreversible colloidal structures and ion exchanges with toxic metals and organics by means of the intercalation compounds and intermediary hydration products. In a high percentage of reactions with halogenated hydrocarbons, a bimolecular displacement or substitution occurs as the first step in the linking mechanism to the second phase macromolecules. Various organometallic bonding is likely with the added metal compounds in the fixant.

In the second phase, the generation of the macromolecule framework, also involves a relatively irreversible colloid synthesis. This is a slower reaction, however, going from sol to gel, and finally to a crystalline, three-dimensional inorganic polymer. The treated material should be able to pass currently proposed leaching standards within from seven to twenty-eight days. Of particular importance in the bonding of the hazardous elements and compounds is the development of the second phase reaction of sulpho-ferri-aluminate hydrates. The bonding characteristics and structural durability are varied to accommodate a particular application by varying the composition of the fixant.

Specific examples will illustrate the efficacy of the fixant in the illustrative applications.

EXAMPLE I

Initial Treatability Studies of Coal Gasification Waste

The nature of the waste is in the form of contaminated soils and tars. In order to treat this waste an approach had to be developed so that the tar could be mixed effectively with the cementitious based mixture which includes a fixant described previously in a slurry form, that is mixed with water. The fixant used in this example includes 19% b.w. of ferric sulfate, 19% b.w. of manganese sulfate; 46% b.w. of various organophilic smectite clays; and 16% b.w. of an oxidizing agent, potassium persulfate. This fixant is then added into a second mixture comprising: a cement, of 50% b.w. of said fixant, blast furnace slag, of 31% b.w. of said fixant, gypsum, of 6% of the weight of said fixant, organophilic smectite clays, of 6% of the weight of said fixant, ferric sulfate, of 2.5% of the weight of said fixant, manganese sulfate, of 2.5% of the weight of said fixant, and potassium persulfate, of 2% of the weight of said fixant.

Other constraints were that excessive bulking agents were not added to the tar that would expand the volume of contaminated materials that needed to be treated any more than necessary. Also too large additions of cement or pozzolan material would generate considerable heat of hydration and boil off a considerable amount of volatile and semi-volatile toxic compounds. What was worked out was the following:

Firstly low levels of various complexing agents, ferric sulfate and organophilic clays were mixed, this mixture was 85 weigt percent organophilic clays and 15 weight percent ferric sulfate, into a given amount of the contaminated soil. This complexing agent mixture was added at 3.7% by weight of the soil. Then this soil was blended into the tar at a ratio of three parts soil to one part tar. This gave a mixture that was treatable at 20% by weight of blended soil and tar with the above described mixture of fixant, cement, slag, and gypsum. The following are the TCLP results, obtained on this treated waste after a seven day cure. The unconfined compressive strength of the samples exceeded 100 psi. In this case the fixant based mixture based materials performed better than other attempted formulations. It is believed that in the case of high levels of background saturated long chain hydrocarbons in the waste and that the use of organo-clays are better suited to this condition than fixation mixtures that do not. The below listed contaminants are the major ones. There are a multitude of compounds in minor concentrations.

| Pure Soil Sample | Untreated Range (ppm) | Treated (ppm) |
|---|---|---|
| Lead | 200 to 13.000 | <0.01 |
| PNA compounds* | 0.2 to 70 | <0.001 |
| Benzene | 0.007 to 0.67 | <0.001 |

*PNA = polynuclear aromatic

Treatment of a 75% Soil plus 25% Tar Sample (Untreated Numbers Below Reflect Tar Only).

| | Untreated Range (ppm) | Treated (ppm) |
|---|---|---|
| Lead | 37 to 100 | <0.01 |
| PNA compounds | 1.000 to 50.000 | Naphtalene 1.52 Anthracene 0.08 |
| Benzene | 0 to 3.200 | 0.010 |

The PNA (polynuclear aromatic) compounds leaching will be reduced as the treated matrix ages or could be improved considerably by adding a slighty higher loading of fixant plus a cement, and or slag, and or gypsum, and or lime, and or fly ash mixture.

Further it is, in the presence of large quantities of heavy metals, recommended to add a certain amount of a trimercapto-S-triazine, especially its trisodium salt, to the fixant. The amount of this salt being defined in a preliminary test. The effect of such an addition is that said heavy metals cannot be detected any more in a leach test.

| Combined Formulation | Percent by Weight |
|---|---|
| Ferric sulfate | 2.5% |
| Manganese sulfate | 2.5% |
| Potassium persulfate | 2.0% |
| Organophilic smectite clays | 6.0% |
| Portland cement | 50.0% |
| Blast furnace slag | 31.0% |
| Gypsum | 6.0% |

EXAMPLE II

Treatment of Volatile Organics in a Soil Material With Various Fixation Materials—The Issue of Volatilization During Chemical Fixation Treatment In two recent analysises a number of chemical fixation/stabilization designs were bench tested in a treatment of a spiked soil samples from Miami, Fla., with seven volatile organic compounds (VOCs). The mixing of the samples for the TCLP test, prescribed U.S.E.P.A. leaching test procedures, took place in a controlled and enclosed atmosphere, at the samples were checked for the degree of volatilization or less of the VOCs during mixing and curing with the fixant plus cement, gypsum and slag. Temperature profiles of the samples before and during treatment were also plotted.

In Test 1 soil samples were spiked with the following compounds and concentrations: Benzene 75 ppm, Chlorobenzene 150 ppm, m-xylene 10 ppm, 1.1 dichloroethane 10 ppm, 1,3 dichloropropylene 10 ppm, carbon tetrachloride 10 ppm, and ethyl benzene 10 ppm. In Test 2 the soil sample was spiked with 362 ppm of trichloroethylene, TCE.

Untreated soil samples leached total organics on average approximately 200 ppm using the TCLP.

All Test 1 samples were treated at 15% by weight of soil with the fixant treatment material, with a 30 day cure. Samples in Test 2 were treated at 20% by weight of soil. All references below to TCE are from Test 2. Only the fixant, the combined formulation is described in Example 1, cement, and kiln dust were tested in Test 2 with TCE.

Methanol Extraction of Treated Material—Detectable Extraction Data (ppb)

Combined fixant Formulation—All toxics were non-detectable Cement-220 benzene, 3800 chlorobenzene, 150 ethyl benzene, 300 xylene.

Lime/kiln dust—856 benzene, 9870 chlorobenzene, 576 ethyl benzene, TCE 450 xylene TCLP Leach Data of Treated Soil Material—Detectable Leach Data (ppb)

Combined Fixant Formulation—All toxics are non-detectable Cement—38 benzene, 1151 chlorobenzene, 9 TCE Lime/kiln dust—140 benzene, 1213 chlorobenzene, 21 TCE The starting temperature of the samples was 17C in Test 1 and 16C in Test 2, the combined fixant went to 28C in Test 1 and 23C in Test 2, cement went to 30C in Test 1 and 29C in Test 2, and lime/kiln dust went to 36C in Test 1 and 29C in Test 2. Total VOCs lost into the air during mixing and curing were 1.5% in Test 1 and 0.9% in Test 2 for the combined fixant, 5.1% in Test 1 and 6.5% in Test 2 for cement, and 6.4% in Test 1 and 7.4% in Test 2 for lime/kiln dust. This air leaching should be reduced significantly if the application is done in-place, underground, instead of in the open in an above ground mixer.

Summary of Experiment II

| | Benzene | Chlorobenzene | xylene | ethyl benzene |
|---|---|---|---|---|

-continued

| | Concentration Added (PPM) | | | |
|---|---|---|---|---|
| Test 1 | 75 | 150 | 10 | 10 |
| TCE Test 2 | 362 | | | |

| | Benzene | Chlorobenzene | Xylene | Ethyl benzene | TCE |
|---|---|---|---|---|---|
| | TCLP Leach Data (PPB) | | | | |
| Cement | 38 | 1151 | | | 9 |
| LK Dust | 140 | 1213 | | | 21 |
| Fixant | | | | | <5 |
| | Solvent Extraction Data (PPB) | | | | |
| Cement | 220 | 3800 | 300 | 150 | |
| LK Dust | 856 | 9870 | 450 | 576 | |
| Fixant | | | | | |

The starting temperature of the material was 17C in Test 1 and 16C in Test 2 and a level of treatment in Test 1 at 15% by weight to contaminated soil and 20% in Test 2.

| | Maximum Heat of Reaction Temperature and Percent Volatilization | | | |
|---|---|---|---|---|
| | Test 1 | | Test 2 (TCE) | |
| Cement | 30C | 5.1% | 29C | 6.5% |
| LK Dust | 36C | 6.4% | 29C | 7.4% |
| Fixant | 28C | 1.5% | 23C | 0.9% |

EXAMPLE III

| | Percent by Weight |
|---|---|
| Fixant for Example III | |
| Organophilic clays | 55.6% |
| Ferric sulfate | 22.2% |
| Manganese sulfate | 22.2% |
| Combined Formulation | |
| Portland cement | 54% |
| Blast furnace slag | 31% |
| Gypsum | 6% |
| Ferric sulfate | 2% |
| Manganese sulfate | 2% |
| Organophilic clays | 5% |

The fixant from Example I was blended into a sandy soil contaminated with PCBs. The sample averaged 6000 ppm of contaminates. Extraction by ultrasonic hexane technique yielded 1300 ppm of PCB. The sample was treated identically to that of Example I, except that the treatment level was twenty-five weight percent (25%). Allowing for dilution of the sample by the introduction of fixant, seventy-one (71%) of the PCBs were converted into an inert organic-organic complexes.

Under the EP Toxicity Test with glass fiber filter, only 80 ppt leached. This sample cured from four to five weeks before testing.

These examples show the remarkable results achieved by the use of the fixant.

Having described preferred embodiments of the invention, it is to be understood that the invention is not limited to those precise embodiments, and that various changes and modifications may be effected therein by one skilled in the art without departing from the scope or spirit of the invention as defined in the appended claims. Such modifications being for example the use of another clay mineral, the use of metal chlorides instead of sulfates, or the replacement of the iron salt by a cobalt salt. It will also be obvious that the oxidizing agent can be varied. Further it is emphasized that the expression iron salt means the ferrous as well as the ferric salt.

We claim:

1. A fixant for mixing with toxic waste to minimize the leachability of said toxic waste, said fixant comprising at least a clay mineral, an iron salt, a manganese salt, an oxidizer, and an inorganic hydraulic binder to fix the obtained compounds into a hard, rock-like product.

2. A fixant according to claim 1, wherein said oxidizer is chosen from the group comprising sodium persulfate, potassium persulfate and potassium permanganate.

3. A fixant according to claim 1, wherein said fixant further comprises an aluminium salt.

4. A fixant according to claim 1, wherein said metal salts are chosen from among the sulfates and chlorides.

5. A fixant according to claim 1, wherein said iron salt is at least partially replaced by a cobalt salt.

6. A fixant according to claim 1, wherein said clay includes a clay of the smectite group, preferably sodium bentonite or hectorite.

7. A fixant according to claim 6, wherein said clay is an organophilic clay.

8. A fixant according to claim 1, wherein said clay has been pre-treated with an ammonium compound, preferably chosen from the group comprising amines, purines and pyridines.

9. A fixant according to claim 1, wherein said clay has been treated with a polyhedric alcohol.

10. A fixant according to claim 1, wherein said fixant comprises up to 25% b.w. of said iron and/or cobalt salt, especially from 15 to 19 % b.w.

11. A fixant according to claim 1, wherein said fixant comprises up to 25% b.w. of said manganese salt, especially from 15 to 19% b.w.

12. A fixant according to claim 1, wherein said fixant comprises from 30 to 60% b.w. of said clay mineral, especially from 35 to 50% b.w.

13. A fixant according to claim 1, wherein said fixant comprises up to 25% b.w. of said oxidizer b.w.

14. A fixant according to claim 4, wherein said fixant comprises up to about 15% b.w. of said aluminium salt, especially about 12% b.w.

15. A fixant according to claim 1, wherein said binder is chosen from the group comprising a cement; ground and/or granulated blast furnace slags; fine and/or ground steel slags; porous granulated steel slags; lime; or a mixture thereof.

16. A fixant according to claim 1, wherein said fixant further comprises trimercapto-S-triazine trisodium salt.

17. A process for treating toxic waste to minimize the leachability of said toxic waste by chemical conversion and complexing said waste into innocuous compounds, comprising preparing a mixture by mixing said waste with a fixant comprising at least a clay mineral, an iron salt, a manganese salt, an oxidizer, and an inorganic hydraulic binder to fix the obtained compounds into a hard rock-like product.

18. A process according to claim 17, wherein said fixant comprises an organophilic clay, iron sulfate, manganese sulfate and an oxidizer chosen from among sodium persulfate, potassium persulfate and potassium permanganate.

19. A process according to claim 17, wherein said inorganic hydraulic binder is chosen from the group comprising a cement; ground and/or granulated blast furnace slags; fine and/or ground steel slags; porous granulated steel slags; lime; or a mixture thereof.

* * * * *